United States Patent
Cui et al.

(10) Patent No.: US 11,280,357 B1
(45) Date of Patent: Mar. 22, 2022

(54) HYDRAULIC VARIABLE PUMP SET AND EXCAVATOR

(71) Applicants: WEICHAI POWER CO., LTD., Shandong (CN); LINDE HYDRAULICS (CHINA) CO., LTD., Shandong (CN)

(72) Inventors: Kai Cui, Shandong (CN); Xuxin Qin, Shandong (CN); Guoxi Yang, Shandong (CN); Fei Yang, Shandong (CN)

(73) Assignees: LINDE HYDRAULICS (CHINA) CO., LTD., Shandong (CN); WEICHAI POWER CO., LTD., Shandong (CN)

( * ) Notice: Subject to any disclaimer, the term of this patent is extended or adjusted under 35 U.S.C. 154(b) by 0 days.

(21) Appl. No.: 17/418,421

(22) PCT Filed: Dec. 26, 2018

(86) PCT No.: PCT/CN2018/123851
§ 371 (c)(1),
(2) Date: Jun. 25, 2021

(87) PCT Pub. No.: WO2020/132934
PCT Pub. Date: Jul. 2, 2020

(51) Int. Cl.
*E02F 9/22* (2006.01)
*F15B 15/20* (2006.01)
(Continued)

(52) U.S. Cl.
CPC .......... *F15B 15/204* (2013.01); *B60K 15/03* (2013.01); *B60K 2015/03243* (2013.01);
(Continued)

(58) Field of Classification Search
CPC .......... F15B 2211/20553; E02F 9/2285; E02F 9/2286
See application file for complete search history.

(56) References Cited

U.S. PATENT DOCUMENTS 4,738,102 A * 4/1988 Kropp .................. F15B 11/165
60/427
4,870,819 A * 10/1989 Walzer .............. G05D 16/2097
60/422

(Continued)

FOREIGN PATENT DOCUMENTS

CN 102588359 A 7/2012
CN 203639965 U 6/2014
(Continued)

OTHER PUBLICATIONS

International Search Report issued by the China National Intellectual Property Administration (ISA/CN) in connection to International Application No. PCT/CN2018/123851 dated Sep. 24, 2019, pp. 1-3, English translation.

*Primary Examiner* — Thomas E Lazo
(74) *Attorney, Agent, or Firm* — Carter, DeLuca & Farrell LLP; George Likourezos

(57) ABSTRACT

Provided is a hydraulic variable pump set, including a pump body component and an oil supplement component. The pump body component includes a pump body, a first slide valve, and a first control valve. The first slide valve includes a spring end and a pilot cavity. The first control valve is provided with an oil inlet A, an oil inlet B, and an oil outlet T. The pump body includes a variable pump and a variable cylinder. The variable pump includes a swash plate. The variable cylinder includes a rod cavity and a rodless cavity. The variable cylinder is mechanically connected to the spring end and the swash plate. The oil supplement component is in communication with the pilot cavity.

20 Claims, 2 Drawing Sheets

(51) Int. Cl.
*B60K 15/03* (2006.01)
*E02F 9/08* (2006.01)

(52) U.S. Cl.
CPC ........... *E02F 9/0883* (2013.01); *E02F 9/2225* (2013.01); *E02F 9/2267* (2013.01); *E02F 9/2285* (2013.01); *E02F 9/2296* (2013.01); *F15B 2211/20553* (2013.01)

(56) References Cited

U.S. PATENT DOCUMENTS

| | | | | |
|---|---|---|---|---|
| 5,297,381 | A * | 3/1994 | Eich | E02F 9/22 60/452 |
| 8,640,451 | B2 * | 2/2014 | Akiyama | E02F 9/2296 60/434 |
| 9,546,468 | B2 * | 1/2017 | Bang | E02F 9/2235 |
| 9,709,046 | B2 * | 7/2017 | Krittian | F02N 11/0814 |
| 9,726,203 | B2 * | 8/2017 | Knapper | F15B 13/028 |
| 2008/0112818 | A1 * | 5/2008 | He | F15B 1/024 417/46 |

FOREIGN PATENT DOCUMENTS

| | | |
|---|---|---|
| CN | 103939405 A | 7/2014 |
| CN | 104019066 A | 9/2014 |
| CN | 104480991 A | 4/2015 |
| CN | 105090141 A | 11/2015 |
| CN | 105113570 A | 12/2015 |
| CN | 205136169 U | 4/2016 |
| CN | 106609779 A | 5/2017 |
| CN | 107664146 A | 2/2018 |
| CN | 108105179 A | 6/2018 |
| CN | 207762036 U | 8/2018 |
| JP | 2012162917 A | 8/2012 |
| WO | 2013035521 A1 | 3/2013 |

* cited by examiner

HYDRAULIC VARIABLE PUMP SET AND EXCAVATOR

This application is a U.S. National Stage Application of PCT Application Serial No. PCT/CN2018/123851, filed Dec. 26, 2018, the disclosure of which is incorporated herein by reference in its entirety.

TECHNICAL FIELD

The present disclosure relates to the technical field of hydraulic pumps, for example, to a hydraulic variable pump set and an excavator.

BACKGROUND

Patent CN105113570A discloses a hydraulic component configuration of an excavator. The hydraulic oil provided by a main pump enters a negative flux feedback valve after passing through a main control valve, and a pressure signal is generated through an orifice of the negative flux feedback valve. The pressure signal controls a displacement adjustment mechanism of the main pump to adjust a flux of the main pump.

Patent CN104480991A discloses a hydraulic pump control circuit of an excavator. A first variable pump controls the change in the relationship between outlet pressure and displacement through a first variable pump adjustment mechanism, and a second variable pump controls the change in the relationship between outlet pressure and displacement through a second variable pump adjustment mechanism. Each of the first variable pump adjustment mechanism and the second variable pump adjustment mechanism includes four control signals, where a power curve of a variable pump is controlled by three signals, that is, first variable pump outlet pressure, second variable pump outlet pressure, and a power control signal; and displacement of the variable pump is controlled by a fourth control signal. The positions of a movable arm cylinder, a stick cylinder, and a bucket cylinder are determined by a movable arm cylinder displacement sensor, a stick cylinder displacement sensor, a bucket cylinder displacement sensor, the first variable pump outlet pressure, and the second variable pump outlet pressure; based on the above, the first variable pump and the second variable pump are controlled.

In the preceding solutions, the displacement of the variable pump is controlled through a feedback signal of an external control system. In this manner, the control system is complicated in structure and high in cost, the follow-up maintenance is complicated, and the system is large in volume and takes up a large space.

SUMMARY

The present disclosure provides a hydraulic variable pump set and an excavator. In this manner, a structure configured to control output displacement of a variable pump can be integrated with the variable pump, and multiple control components can be integrated so that different control functions can be achieved, and advantages such as a simple structure and a small volume can be achieved.

An embodiment provides a hydraulic variable pump set. The hydraulic variable pump set includes a pump body component and an oil supplement component. The pump body component includes a pump body, a first slide valve, and a first control valve. The first slide valve includes a spring end and a pilot cavity, and the first control valve is provided with an oil inlet A, an oil inlet B, and an oil outlet T. The pump body includes a variable pump and a variable cylinder. The variable pump includes a swash plate, the variable cylinder includes a rod cavity and a rodless cavity, the variable cylinder is mechanically connected to the spring end and the swash plate, and the oil supplement component is in communication with the pilot cavity. The variable pump is in communication with the oil inlet A of the first control valve, the oil supplement component is in communication with the oil inlet B of the first control valve, the oil outlet T of the first control valve is in communication with the rod cavity, and the rodless cavity is in communication with the oil outlet T of the first control valve through the first slide valve.

An embodiment further provides an excavator, and the excavator includes the hydraulic variable pump set.

Figure 1:
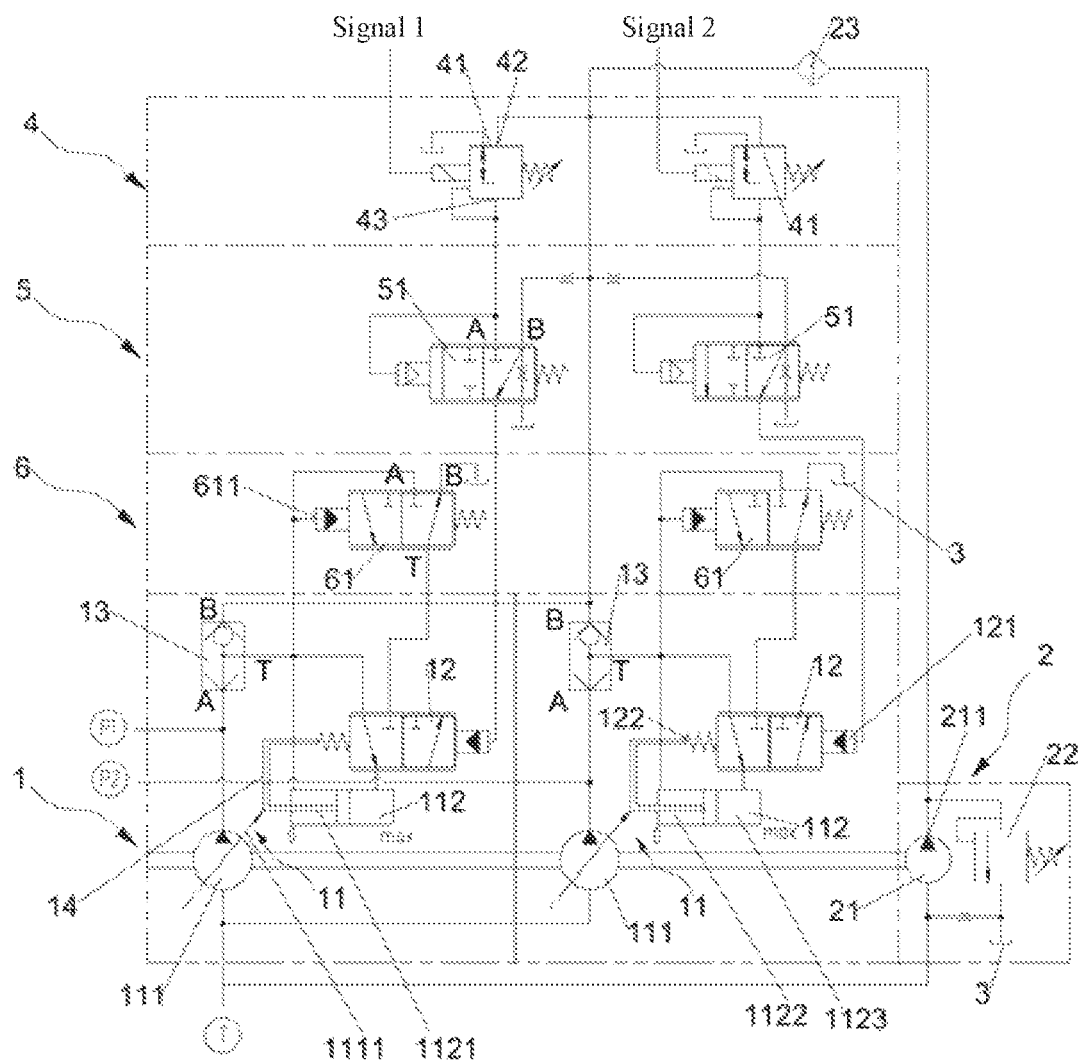
FIG. 1 is a structure diagram of a working principle of a hydraulic variable pump set according to an embodiment of the present disclosure.

REFERENCE LIST 1 pump body component
11 pump body
111 variable pump
1111 swash plate
112 variable cylinder
1121 piston rod
1122 rod cavity
1123 rodless cavity
12 first slide valve
121 pilot cavity
122 spring end
13 first control valve
14 feedback rod
2 oil supplement component
21 oil supplement pump
211 oil outlet of the oil supplement pump
22 overflow valve
23 filter
3 fuel tank
4 electronically-controlled pressure relief component
41 solenoid valve
42 oil inlet
43 oil outlet
5 failure-safety component
51 second control valve
6 pressure cutoff component
61 third control valve
611 pilot end

DETAILED DESCRIPTION

Figure 2:
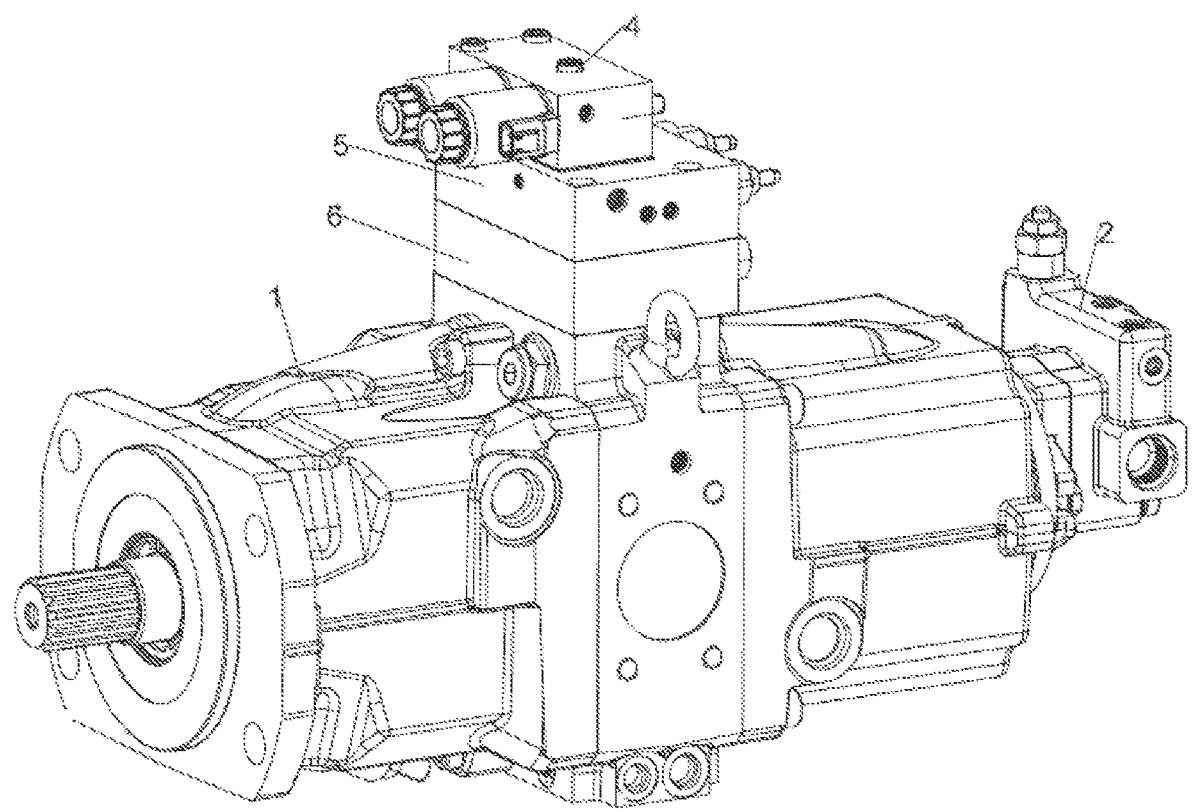
FIG. 2 is a structure diagram of the hydraulic variable pump set according to an embodiment of the present disclosure.

As shown in FIGS. 1 and 2, this embodiment provides a hydraulic variable pump set. The hydraulic variable pump set includes a pump body component 1, an oil supplement component 2, an electronically-controlled pressure relief component 4, a failure-safety component 5, and a pressure cutoff component 6.

The pump body component 1 includes a pump body 11, a first slide valve 12, and a first control valve 13. The pump body 11 includes a variable pump 111 and a variable cylinder 112. In this embodiment, the variable pump 111 is a one-way variable pump, an oil inlet of the variable pump 111 is in communication with a fuel tank 3, an oil outlet of the variable pump 111 is connected to an oil inlet A of the first control valve 13, the oil supplement component 2 is in communication with an oil inlet B of the first control valve 13, an oil outlet T of the first control valve 13 is in communication with a rod cavity 1122 of the variable cylinder 112 through one pipeline, and a rodless cavity 1123 of the variable cylinder 112 is in communication with the oil outlet T and the fuel tank 3 through the first slide valve 12.

Hydraulic oil provided by the oil supplement component 2 for the first control valve 13 is used as control pilot oil of the first control valve 13, and the variable pump 111 also provides oil for the first control valve 13. The first control valve 13 is used as a selection valve, and one of the hydraulic oil provided by the oil supplement component 2 or the hydraulic oil provided by the variable pump 111 whose pressure is relatively high is selected as a control oil source of the first control valve 13.

The first control valve 13 is a shuttle valve and may also be a two-position two-way solenoid valve.

The variable cylinder 112 is mechanically connected to a pilot cavity 121 of the first slide valve 12 and a swash plate 1111 of the variable pump 111. In an embodiment, a piston rod 1121 of the variable cylinder 112 is mechanically connected to the swash plate 1111 of the variable pump 111, the swash plate 1111 of the variable pump 111 is connected to a feedback rod 14, and the feedback rod 14 is connected to the pilot cavity 121 of the first slide valve 12. The movement of the variable cylinder 112 acts on the pilot cavity 121 through the feedback rod 14. The pilot cavity 121 of the first slide valve 12 is in communication with the oil supplement component 2. The oil supplement component 2 provides pilot oil for the first slide valve 12. The pilot oil provided by oil supplement component 2 pushes a valve element of the first slide valve 12 to move.

The oil outlet of the variable pump 111 is in communication with an external hydraulic control system through a port P1 in FIG. 1 so that various movements of an excavator can be controlled.

In the case where the pump body component 1 is working and output displacement of the variable pump 111 is at a stable value, the valve element of the first slide valve 12 is at a preset position, that is, the pressure applied by the pilot oil on one side of the valve element of the first slide valve 12 is the same as the pressure applied by a spring on the other side of the valve element of the first slide valve 12. In this case, the pressure of the rod cavity 1122 of the variable cylinder 112 is balanced with the pressure of the rodless cavity 1123 of the variable cylinder 112.

In the case where the first slide valve 12 is in an initial state, the spring of the first slide valve 12 is compressed, and the valve element of the first slide valve 12 is at a leftmost position. In this case, the movement of the feedback rod 14 toward the left always changes the compression amount of the spring, and the spring is not in a stretched state.

In the case where the displacement of the variable pump 111 needs to be adjusted, for example, in the case where the displacement of the variable pump 111 needs to be increased, the oil supplement component 2 is controlled to provide the pilot oil for the pilot cavity 121 at a right end of the first slide valve 12, and the pressure in the pilot cavity 121 increases. In this case, the valve element of the first slide valve 12 moves toward the left. If the pressure of the hydraulic oil output from the oil outlet of the variable pump 111 is greater than the pressure of the hydraulic oil provided by the oil supplement component 2, a valve element of the first control valve 13 moves upward, and the path on which the hydraulic oil provided by the variable pump 111 passes through the first control valve 13 is from the oil inlet A to the oil outlet T.

The oil outlet T of the first control valve 13 is branched to the rod cavity 1122 and the rodless cavity 1123 of the variable cylinder 112 through pipelines, that is, the oil outlet T of the first control valve 13 is directly in communication with the rod cavity 1122 of the variable cylinder 112 through a first branch, and the oil outlet T of the first control valve 13 is in communication with the rodless cavity 1123 of the variable cylinder 112 through an internal passage of the first slide valve 12 on a second branch.

Since the first slide valve 12 is a servo valve, the movement of the valve element of the first slide valve 12 affects the opening degree of a valve port. In the case where the valve element of the first slide valve 12 moves toward the left, the opening degree of an oil port on the first slide valve 12 along a direction in which the hydraulic oil enters the rodless cavity 1123 becomes smaller, the opening degree of an oil port on the rodless cavity 1123 along a direction in which the hydraulic oil flows from the first slide valve 12 to the fuel tank 3 becomes larger, and the pressure in the rodless cavity 1123 becomes lower. In this case, a force applied by the hydraulic oil in the rod cavity 1122 of the variable cylinder 112 on a piston is greater than a force applied by the hydraulic oil in the rodless cavity 1123 on the piston, and the piston A is pushed to move toward the right. In addition, the swash plate 1111 is pushed through the piston rod 1121. In this case, a swing angle of the swash plate 1111 can be increased, the displacement of the variable pump 111 can be increased, the swash plate 1111 drives the feedback rod 14, and the feedback rod 14 acts on the pilot cavity 121 so that the valve element of the first slide valve 12 moves toward the right. In the process of constant adjustment of the pressure in the rod cavity 1122 and the pressure in the rodless cavity 1123 of the variable cylinder 112, the rodless cavity 1123 and the rod cavity 1122 reach a balanced state, and the valve element of the first slide valve 12 is stabilized at a preset position again. In this case, the displacement of the variable pump 111 has a stable output.

One of a pilot oil source provided by the oil supplement component 2 or the hydraulic oil provided by the variable pump 111 whose pressure is relatively high is used as the control oil source of the first control valve 13. Under normal circumstances, an outlet P1 of the variable pump 111 is connected to an external load. Therefore, in the case where the variable pump 111 is working, the pressure generated in a pipeline between the variable pump 111 and the first control valve 13 is greater than the pressure of the pilot oil provided by the oil supplement component 2, and the hydraulic oil provided by the variable pump 111 is used as control oil of the first control valve 13.

However, when the variable pump 111 is working, if the pipeline between the variable pump 111 and the first control valve 13 cannot generate oil pressure capable of pushing the valve element of the first control valve 13 to move, oil cannot enter the oil inlet A (for example, when the equipment is always in a slipping state, since the pressure in the hydraulic variable pump set is determined by the load, in this case, if the pressure cannot be established between the variable pump 111 and the first control valve 13); and if the output displacement of the variable pump 111 needs to be adjusted, since pressure cannot be established in the pipeline between the variable pump 111 and the first control valve 13, hydraulic oil output from the variable pump 111 cannot flow to the variable cylinder 112 through the first control valve 13, the hydraulic oil in the rodless cavity 1123 and the rod cavity 1122 in the variable cylinder 112 basically does not change, and the variable displacement of the variable pump 111 cannot be achieved. In this case, the oil supplement component 2 is used as the control oil source of the first control valve 13, hydraulic oil in the oil supplement component 2 is divided into the first branch and the second branch after passing through the oil inlet B and the oil outlet T of the first control valve 13, the hydraulic oil is provided for the rodless cavity 1123 of the variable cylinder 112 through the first branch, and the hydraulic oil is provided for the rod cavity 1122 through the second branch; after the hydraulic oil is provided for the variable cylinder 112, the piston rod 1121 starts to move; and finally the piston rod 1121 of the variable cylinder 112 reaches a balanced state again. In the adjustment and balancing process of the piston of the variable cylinder 112, the swash plate 1111 of the variable pump 111 moves with the piston rod 1121, and the feedback rod 14 is driven by the swash plate 1111 to move. When the valve element of the first slide valve 12 is in a stable state, the displacement of the variable pump 111 remained stable again.

An oil inlet 42 of the electronically-controlled pressure relief component 4 is in communication with the oil supplement component 2, an oil outlet 43 of the electronically-controlled pressure relief component 4 is in communication with the pump body component 1, and the electronically-controlled pressure relief component 4 may control the pressure of the pilot oil source provided by the oil supplement component 2 for the pump body component 1.

In an embodiment, the electronically-controlled pressure relief component 4 includes a solenoid valve 41, and the pressure of the hydraulic oil output to the pump body component 1 is controlled by the solenoid valve 41. In this embodiment, the solenoid valve 41 is an electronically-controlled proportional pressure relief valve. An output end of the solenoid valve 41 is connected to the pilot cavity 121 of the first slide valve 12. When the control system sends out a current signal, the solenoid valve 41 starts to work, and input pressure of the solenoid valve 41 comes from the oil supplement component 2. One side of the solenoid valve 41 is provided with a control terminal, and an input current signal enables the control terminal to push the valve element inside the solenoid valve 41 to move so that the opening degree of an oil circuit in the solenoid valve 41 can be adjusted, and thus the pressure of the hydraulic oil at the outlet of the solenoid valve 41 can be adjusted. In an embodiment, outlet pressure of the solenoid valve 41 is proportional to the input current signal, that is, the pressure of the hydraulic oil at the outlet of the solenoid valve 41 increases as the current increases, showing a linear proportional relationship.

In addition, in this embodiment, a failure-safety component 5 is disposed in a pipeline between the electronically-controlled pressure relief component 4 and the pump body component 1, the failure-safety component 5 is a pilot control valve, and the working state of the failure-safety component 5 is controlled by the electronically-controlled pressure relief component 4. In the case where the electronically-controlled pressure relief component 4 is working, the oil supplement component 2 provides oil for the pilot cavity 121 of the first slide valve 12 through the electronically-controlled pressure relief component 4 and the failure-safety component 5. In the case where the electronically-controlled pressure relief component 4 is not working, the oil supplement component 2 provides oil for the pilot cavity 121 of the first slide valve 12 through the failure-safety component 5.

The failure-safety component 5 includes a second control valve 51. In an embodiment, the output end of the solenoid valve 41 is in communication with an oil port A of the second control valve 51 and is in communication with a pilot cavity of the second control valve 51, and the oil supplement component 2 is in communication with an oil port B of the second control valve 51. In the case where the electronically-controlled pressure relief component 4 is not working, the oil supplement component 2 provides oil for the pilot cavity 121 of the first slide valve 12 through the failure-safety component 5. In this case, no pilot oil exists in the pilot cavity of the second control valve 51, the second control valve 51 is in a right working state, and the oil port B of the second control valve 51 is always in communication with the pilot cavity 121 of the first slide valve 12. The oil is divided into two paths after entering the second control valve 51 from the oil port B, where one path is in communication with the pilot cavity 121 of the first slide valve 12, and the other path is in communication with the fuel tank; in addition, the path in communication with the fuel tank is provided with an orifice. In the case where the electronically-controlled pressure relief component 4 is working, part of the hydraulic oil from an outlet of the electronically-controlled pressure relief component 4 is used as pilot oil and acts on one end of the second control valve 51 so that the second control valve 51 is in a left working state. In this case, the oil port B is closed, and the oil in the oil supplement component 2 may only communicate with the second control valve 51 through the electronically-controlled pressure relief component 4 and then communicate with the pilot cavity 121 of the first slide valve 12. Through the preceding structure, the pilot cavity 121 of the first slide valve 12 is in communication with the oil supplement component 2, and the control pressure of the pilot cavity 121 of the first slide valve 12 is adjusted by different working positions of the electronically-controlled pressure relief component 4 and the failure-safety component 5. In this embodiment, the second control valve 51 is a two-position four-way servo slide valve, and oil can pass through the second control valve 51 in two directions.

In the case where the displacement of the variable pump 111 is large and the system is too high in pressure, the output power of the hydraulic variable pump set can be reduced by reducing the displacement of the variable pump 111 so that engine failure and energy loss caused by excessive power can be avoided. Therefore, a pressure cutoff component 6 is provided. The pressure cutoff component 6 is connected to a pipeline between the first control valve 13 and the first slide valve 12. In the case where the output pressure of the variable pump 111 reaches a preset pressure threshold, the pressure cutoff component 6 operates so that the rod cavity 1122 of the variable cylinder 112 is in communication with the rodless cavity 1123 of the variable cylinder 112.

The pressure cutoff component 6 includes a third control valve 61, where the third control valve 61 is a two-position three-way servo slide valve, the oil outlet T of the first control valve 13 may simultaneously communicate with a pilot end 611 of the third control valve 61 and an oil port A of the third control valve 61, and an oil port T of the third control valve 61 is in communication with the first slide valve 12. In the case where the displacement of the variable pump 111 is not the maximum (that is, the first slide valve 12 is not at the leftmost position) and the third control valve 61 does not operate, the rodless cavity 1123 of the variable cylinder 112 is always in communication with the fuel tank 3 through the first slide valve 12 and the third control valve 61. In this working state, the rodless cavity 1123 of the variable cylinder 112 is in communication with the fuel tank 3 through an internal passage of the second control valve 12, the oil port T of the third control valve 61, and the oil port B of the third control valve 61. In the case where the third control valve 61 operates, the rod cavity 1122 of the variable cylinder 112 may communicate with the rodless cavity 1123 of the variable pump 111 through the third control valve 61 and the first slide valve 12. In this case, if a valve element of the third control valve 61 is not completely in the left working state, the rodless cavity 1123 is still in communication with the fuel tank 3.

At an initial position, the third control valve 61 is at the right working state. In this case, the rod cavity 1122 of the variable cylinder 112 does not communicate with the rodless cavity 1123 of the variable cylinder 112. However, in this case, if the variable pump 111 is in a stable displacement state, the rodless cavity 1123 of the variable cylinder 112 is in communication with the fuel tank through the first slide valve 12 and the third control valve 61. If the variable pump 111 is applied to an excavator, in the case where the displacement of the variable pump 111 is very large and the movement of the excavator is blocked, a port P1 of the hydraulic variable pump set in this embodiment is connected to an external load system, the external load system controls the pressure in pipelines of the hydraulic variable pump set in this embodiment, and the pressure is determined by the external load system. In the case where the pressure in the hydraulic variable pump set increases to the preset pressure threshold of the third control valve 61, the pressure cutoff component 6 takes effect, that is, the valve element of the third control valve 61 moves. The valve element of the third control valve 61 moves so that the rodless cavity 1123 is in communication with the rod cavity 1122, and the displacement of the variable pump 111 can be controlled through the adjustment of the variable cylinder 112. The displacement of the variable pump 111 is controlled so that the purpose of controlling the output power of the variable pump 111 can be achieved. In an embodiment, hydraulic oil from the oil outlet T of the first control valve 13 is used as pilot oil of the third control valve 61 and acts on the pilot end 611 of the third control valve 61, and the valve element of the third control valve 61 is pushed to move toward the right. In this case, the rodless cavity 1123 is in communication with the rod cavity 1122.

The opening degree of the valve element of the third control valve 61 along a direction in which the hydraulic oil flows to the rodless cavity 1123 becomes larger, and the opening degree of the valve element of the third control valve 61 along a direction in which the hydraulic oil returns to the fuel tank 3 from the rodless cavity 1123 becomes smaller. That is, the high-pressure oil passing through the rod cavity 1122 flows to the rodless cavity 1123 of the variable cylinder 112 through the oil port A and the oil port T of the third control valve and the first slide valve 12. The rod cavity 1122 and the rodless cavity 1123 are high-pressure oil, and the hydraulic oil returning to the fuel tank causes less pressure drop in the rodless cavity 1123. Therefore, the pressure applied by the hydraulic oil in the rodless cavity 1123 on the piston is gradually greater than the pressure applied by the hydraulic oil in the rod cavity 1122 on the piston, and the piston is pushed to move toward the left. In this case, the swing angle of the swash plate 1111 becomes smaller, and the output displacement of the variable pump 111 becomes the small displacement until the two cavities are in the balanced state, and the output displacement of the variable pump 111 is stable again.

The first slide valve 12 and the third control valve 61 are used as variable control valves of the variable pump 111, the variable direction and variable degree of the variable pump 111 are controlled according to the pressure of the pilot oil, and the magnitudes of the openings of the first slide valve 12 and the third control valve 61 are in a linear proportional relationship with the variable degree of the variable pump 111.

The oil supplement component 2 includes an oil supplement pump 21 and an overflow valve 22. An oil outlet 211 of the oil supplement pump 21 is connected to the pump body component 1, the failure-safety component 5, and the pressure cutoff component 6. The oil supplement pump 21 provides pilot oil for the preceding multiple components. In an embodiment, the oil supplement pump 21 is in communication with the solenoid valve 41, the first control valve 13, and the second control valve 51 through a filter 23.

The overflow valve 22 is in communication with and in parallel with the oil supplement pump 21, and the oil supplement pump 21 is in a form of a quantitative gear pump and is integrated with the overflow valve. The output flux of the quantitative gear pump is constant, while the system controls the oil to continuously change according to the requirements. Therefore, based on a case where it is ensured that the pilot oil required by the multiple components of the system is provided, the rest of the hydraulic oil is overflowed to the fuel tank 3 through the overflow valve 22, and part of the hydraulic oil is overflowed to an oil suction port of the oil supplement pump 21 so that the balance of system cooling and energy saving can be achieved.

In this embodiment, the hydraulic variable pump set includes two pump body components 1, and each pump body component 1 corresponds to one electronically-controlled pressure relief component 4, one failure-safety component 5, and one pressure cutoff component 6. In an embodiment, each pump body component 1 is correspondingly connected to one solenoid valve 41, one second control valve 51, and one third control valve 61. Variable pumps 111 of the two pump bodies 11 communicate with each other, but the variable pumps 111 of the two pump bodies 11 are controlled independently of each other. An output end of the variable pump 111 of one pump body 11 is provided with a port P1, and an output end of the variable pump 111 of the other pump body 11 is provided with a port P2, where each of the P2 port and the P1 port is configured to communicate with the external hydraulic control system so that various movements of the excavator can be achieved.

The variable pumps 111 of the two pump body components 1 and the oil supplement pump 21 of one oil supplement component 2 are connected in series and in sequence. Drive shafts of the two variable pumps 111 and a drive shaft of the oil supplement pump 21 are connected in series and in sequence, and the same engine (motor) is shared for driving so that a triple pump structure is formed. The two pump body components 1, the two electronically-controlled pressure relief components 4, the two failure-safety components 5, and the two pressure cutoff components 6 all share one oil supplement component 2, and the oil supplement component 2 provides pilot oil. The two electronically-controlled pressure relief components 4 can individually control different oil pressure outputs.

In this embodiment, through the combination of the solenoid valve 41 and the slide valve, multiple functions of the main hydraulic pump of the excavator can be achieved, and the multiple functions include an electronic proportional control function, a pressure cutoff function, a failure-safety function, and an oil supplement function. Power control can be achieved by combining with the electronic control component. Advantages such as sound functions, a reasonable structure, simple control, and high reliability can be achieved so that the use requirements of the excavator can be fully satisfied.

In this embodiment, in the case where the electrical control system of the excavator fails, the hydraulic pump can automatically reach the maximum displacement so that it is ensured that the excavator can perform work and walking functions.

In this embodiment, the component arrangement is adopted, and functional components can be added or removed according to actual applications so that the structure is simple, the maintenance is convenient, the layout is beautiful, and the cost is low.

This embodiment further provides an excavator, and the excavator includes the hydraulic variable pump set. The excavator in this embodiment is a crawler excavator.

In this embodiment, the oil supplement component 2 provides pilot oil for the first slide valve 12 and the first control valve 13, and at the same time, the hydraulic pump provides hydraulic oil for the first control valve 13. The first control valve 13 selects the pilot oil or the hydraulic oil as output oil based on the magnitudes of the forces applied by the pilot oil and the hydraulic oil. Since an oil outlet of the first control valve 13 is in communication with the rodless cavity 1123 of the variable cylinder 112 through the first slide valve 12, the oil in the rodless cavity 1123 is the pilot oil provided by the oil supplement component 2 or the hydraulic oil provided by the variable pump 111.

If the output displacement of the variable pump 111 needs to be increased, the valve element of the first slide valve 12 is controlled to move toward the right. In this case, the opening degree of the first slide valve 12 along a direction in which the oil in the rodless cavity 1123 returns the fuel tank 3 through the first slide valve 12 gradually becomes larger; and the opening degree of the first slide valve 12 along a direction in which the oil enters the rodless cavity 1123 from the first slide valve 12 becomes smaller. Therefore, the oil pressure in the rodless cavity 1123 gradually decreases. In this case, the force applied by the oil in the rod cavity 1122 on the piston of the variable cylinder 112 is greater than the force applied by the oil in the rodless cavity 1123 on the piston. The variable cylinder 112 is mechanically connected to the pilot cavity 121 of the first slide valve 12. Therefore, in this case, the piston moves toward the right, the swing angle of the swash plate 1111 is increased, and at the same time, the valve element of the first slide valve 12 is driven to move toward the right so that the effect of adjusting the output displacement of the variable pump 111 can be achieved.

The hydraulic variable pump set integrates the variable pump 111, the variable cylinder 112, the first control valve 13, and the first slide valve 12 so that advantages such as a small structure and volume, easy to use, reduced external control structures, and reduced cost can be achieved.

What is claimed is:

1. A hydraulic variable pump set, comprising a pump body component and an oil supplement component, wherein the pump body component comprises a pump body, a first slide valve, and a first control valve, wherein the first slide valve comprises a spring end and a pilot cavity, and the first control valve is provided with an oil inlet A, an oil inlet B, and an oil outlet T;

the pump body comprises a variable pump and a variable cylinder, wherein the variable pump comprises a swash plate, the variable cylinder comprises a rod cavity and a rodless cavity, the variable cylinder is mechanically connected to the spring end and the swash plate, and the oil supplement component is in communication with the pilot cavity; and the variable pump is in communication with the oil inlet A of the first control valve, the oil supplement component is in communication with the oil inlet B of the first control value, the oil outlet T of the first control valve is in communication with the rod cavity, and the rodless cavity is in communication with the oil outlet T of the first control valve through the first slide valve.

2. The hydraulic variable pump set of claim 1, wherein the first control valve is a shuttle valve.

3. The hydraulic variable pump set of claim 1, further comprising an electronically-controlled pressure relief component, wherein the electronically-controlled pressure relief component is provided with an oil inlet and an oil outlet, the oil inlet of the electronically-controlled pressure relief component is in communication with the oil supplement component, the oil outlet of the electronically-controlled pressure relief component is in communication with the pump body component, and the electronically-controlled pressure relief component is configured to control pressure of pilot oil provided by the oil supplement component for the pump body component.

4. The hydraulic variable pump set of claim 3, wherein the electronically-controlled pressure relief component comprises a solenoid valve, wherein the solenoid valve is respectively in communication with the oil supplement component and the first slide valve, and outlet pressure of the solenoid valve is in a linear proportional relationship with a current value configured to control the solenoid valve.

5. The hydraulic variable pump set of claim 4, further comprising a failure-safety component, wherein the failure-safety component is disposed in a pipeline between the electronically-controlled pressure relief component and the pump body component;

the oil supplement component is configured to, in a case where the electronically-controlled pressure relief component is working, provide oil for the pilot cavity through the electronically-controlled pressure relief component and the failure-safety component; and the oil supplement component is configured to, in a case where the electronically-controlled pressure relief component is not working, provide the oil for the pilot cavity through the failure-safety component.

6. The hydraulic variable pump set of claim 5, wherein the failure-safety component comprises a second control valve, wherein the oil supplement component is configured to, in a case where the solenoid valve is not working, always communicate with the pilot cavity through the second control valve, and the oil supplement component is further configured to, in a case where the solenoid valve is working, control the second control valve to work through the solenoid valve and provide the oil for the pilot cavity.

7. The hydraulic variable pump set of claim 6, further comprising a pressure cutoff component, wherein the pressure cutoff component is respectively connected to the first control valve and the first slide valve, and the pressure cutoff component is configured to, in a case where output pressure of the variable pump reaches preset pressure, enable the rod cavity to communicate with the rodless cavity.

8. The hydraulic variable pump set of claim 7, wherein the pressure cutoff component comprises a third control valve, wherein the third control valve comprises a pilot end, an oil port A, an oil port B, and an oil port T, the rod cavity is respectively in communication with the pilot end and the oil port A of the third control Preliminary Amendment valve, and the oil port T of the third control valve is in communication with the first slide valve; and the rod cavity is configured to, in a case where the third control valve moves, be capable of communicating with the rodless cavity through the third control valve and the first slide valve.

9. The hydraulic variable pump set of claim 8, wherein the oil supplement component comprises:

an oil supplement pump, wherein the oil supplement pump is provided with an oil outlet of the oil supplement pump, wherein the oil outlet of the oil supplement pump is respectively connected to the pump body component, the failure-safety component, and the pressure cutoff component; and an overflow valve, wherein the overflow valve is in communication with and in parallel with the oil supplement pump.

10. The hydraulic variable pump set of claim 9, wherein the hydraulic variable pump set comprises two pump body components, wherein each of the two pump body components corresponds to one electronically-controlled pressure relief component, one failure-safety component, and one pressure cutoff component; and drive shafts of variable pumps of the two pump body components and a drive shaft of the oil supplement pump are connected in series and in sequence.

11. An excavator, comprising a hydraulic variable pump set, wherein the hydraulic variable pump set comprises a pump body component and an oil supplement component, wherein the pump body component comprises a pump body, a first slide valve, and a first control valve, wherein the first slide valve comprises a spring end and a pilot cavity, and the first control valve is provided with an oil inlet A, an oil inlet B, and an oil outlet T;

the pump body comprises a variable pump and a variable cylinder, wherein the variable pump comprises a swash plate, the variable cylinder comprises a rod cavity and a rodless cavity, the variable cylinder is mechanically connected to the spring end and the swash plate, and the oil supplement component is in communication with the pilot cavity; and the variable pump is in communication with the oil inlet A of the first control valve, the oil supplement component is in communication with the oil inlet B of the first control valve, the oil outlet T of the first control valve is in communication with the rod cavity, and the rodless cavity is in communication with the oil outlet T of the first control valve through the first slide valve.

12. The excavator of claim 11, wherein the excavator is a crawler excavator.

13. The excavator of claim 11, further comprising a fuel tank, wherein the rodless cavity is in communication with the oil outlet T of the first control valve and the fuel tank through the first slide valve.

14. The excavator of claim 11, wherein the first control valve is a shuttle valve.

15. The excavator of claim 11, wherein the hydraulic variable pump set further comprises an electronically-controlled pressure relief component, wherein the electronically-controlled pressure relief component is provided with an oil inlet and an oil outlet, the oil inlet of the electronically-controlled pressure relief component is in communication with the oil supplement component, the oil outlet of the electronically-controlled pressure relief component is in communication with the pump body component, and the electronically-controlled pressure relief component is configured to control pressure of pilot oil provided by the oil supplement component for the pump body component.

16. The excavator of claim 15, wherein the electronically-controlled pressure relief component comprises a solenoid valve, wherein the solenoid valve is respectively in communication with the oil supplement component and the first slide valve, and outlet pressure of the solenoid valve is in a linear proportional relationship with a current value configured to control the solenoid valve.

17. The excavator of claim 16, wherein the hydraulic variable pump set further comprises a failure-safety component, wherein the failure-safety component is disposed in a pipeline between the electronically-controlled pressure relief component and the pump body component;

the oil supplement component is configured to, in a case where the electronically-controlled pressure relief component is working, provide oil for the pilot cavity through the electronically-controlled pressure relief component and the failure-safety component; and the oil supplement component is configured to, in a case where the electronically-controlled pressure relief component is not working, provide the oil for the pilot cavity through the failure-safety component.

18. The excavator of claim 17, wherein the failure-safety component comprises a second control valve, wherein the oil supplement component is configured to, in a case where the solenoid valve is not working, always communicate with the pilot cavity through the second control valve, and the oil supplement component is further configured to, in a case where the solenoid valve is working, control the second control valve to work through the solenoid valve and provide the oil for the pilot cavity.

19. The excavator of claim 18, wherein the hydraulic variable pump set further comprises a pressure cutoff component, wherein the pressure cutoff component is respectively connected to the first control valve and the first slide valve, and the pressure cutoff component is configured to, in a case where output pressure of the variable pump reaches preset pressure, enable the rod cavity to communicate with the rodless cavity.

20. The excavator of claim 19, wherein the pressure cutoff component comprises a third control valve, wherein the third control valve comprises a pilot end, an oil port A, an oil port B, and an oil port T, the rod cavity is respectively in communication with the pilot end and the oil port A of the third control valve, and the oil port T of the third control valve is in communication with the first slide valve; and the rod cavity is configured to, in a case where the third control valve moves, be capable of communicating with the rodless cavity through the third control valve and the first slide valve.

* * * * *